(12) United States Patent
Okamoto

(10) Patent No.: US 12,231,826 B2
(45) Date of Patent: Feb. 18, 2025

(54) LIGHT AMOUNT ADJUSTING DEVICE, PROJECTION DEVICE, AND LIGHT AMOUNT ADJUSTING METHOD

(71) Applicant: JVCKENWOOD Corporation, Yokohama (JP)

(72) Inventor: Naoya Okamoto, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 628 days.

(21) Appl. No.: 17/567,980

(22) Filed: Jan. 4, 2022

(65) Prior Publication Data

US 2022/0132085 A1 Apr. 28, 2022

Related U.S. Application Data

(63) Continuation of application No. PCT/JP2020/030374, filed on Aug. 7, 2020.

(30) Foreign Application Priority Data

Aug. 21, 2019 (JP) ................. 2019-150915

(51) Int. Cl.
    *H04N 9/31* (2006.01)
    *H04N 9/71* (2006.01)

(52) U.S. Cl.
    CPC ......... *H04N 9/3155* (2013.01); *H04N 9/3182* (2013.01); *H04N 9/3194* (2013.01); *H04N 9/71* (2013.01)

(58) Field of Classification Search
    CPC .. H04N 9/3155; H04N 9/3182; H04N 9/3194; H04N 9/71
    See application file for complete search history.

(56) References Cited

U.S. PATENT DOCUMENTS

| | | | |
|---|---|---|---|
| 2008/0084510 A1* | 4/2008 | Toyooka | H04N 9/3155 348/E9.027 |
| 2011/0043764 A1* | 2/2011 | Narikawa | G03B 21/2013 353/121 |
| 2019/0068864 A1* | 2/2019 | Ohashi | A61B 1/044 |
| 2020/0201157 A1* | 6/2020 | Suzuki | G02B 6/0003 |
| 2021/0011364 A1* | 1/2021 | Iguchi | H04N 9/3155 |

FOREIGN PATENT DOCUMENTS

| | | |
|---|---|---|
| JP | 2000-28988 A | 1/2000 |
| JP | 2018-60077 A | 4/2018 |

* cited by examiner

*Primary Examiner* — Yassin Alata
(74) *Attorney, Agent, or Firm* — Nath, Goldberg & Meyer; Jerald L. Meyer; Tanya E. Harkins

(57) ABSTRACT

At a first time point, a light amount adjusting unit stores the brightness of illumination light as a first brightness, and stores the light intensity of each color component of the illumination light as a first light intensity. A gain adjusting unit sets a gain value of at least one of the individual color components to be a maximum value, and stores the gain value as a first gain value. At a second time point after the first time point, the light amount adjusting unit calculates a ratio between a second light intensity and the first light intensity. The gain adjusting unit corrects the gain values based on the ratio between the second light intensity and the first light intensity.

14 Claims, 10 Drawing Sheets

LIGHT AMOUNT ADJUSTING DEVICE, PROJECTION DEVICE, AND LIGHT AMOUNT ADJUSTING METHOD

CROSS REFERENCE TO RELATED APPLICATION

This application is a Continuation of PCT Application No. PCT/JP2020/030374, filed on Aug. 7, 2020, and claims the priority of Japanese Patent Application No. 2019-150915, filed on Aug. 21, 2019, the entire contents of both of which are incorporated herein by reference.

BACKGROUND

The present disclosure relates to a light amount adjusting device, a projection device, and a light amount adjusting method.

A method is known in which in a projection device such as a projector, an optical sensor is disposed in an optical path or the like of light emitted from a light source to detect the light amount of the light source, and the light source is controlled based on the detected light amount to stabilize the light amount of the light source.

For example, Japanese Unexamined Patent Application Publication No. 2000-28988 (Patent Literature 1) discloses a configuration in which an optical sensor is disposed behind a dichroic mirror disposed in an optical path and a driving unit of a discharge lamp is controlled in accordance with a detection result of the optical sensor. However, the optical sensor only detects the light amount, and it is not possible to confirm the color components of light emitted from a light source. Therefore it is impossible to detect a change in the color balance of the emitted light due to deterioration with time or the like. This makes it difficult to maintain the color balance of a projection video.

Meanwhile, Japanese Unexamined Patent Application Publication No. 2018-60077 (Patent Literature 2) discloses a configuration in which color correction relating to a light-modulation element is performed based on optical information acquired by an optical sensor that is provided near a mirror disposed on an optical path. However, it is difficult to keep the brightness of a projection video constant because only color correction is performed based on the optical information acquired by the optical sensor.

SUMMARY

As described above, a projector device disclosed in Patent Literature 1 had a problem that the color balance is not able to be maintained. A projection device disclosed in Patent Literature 2 had a problem that it is difficult to keep the brightness constant.

A first aspect of one or more embodiments provides a light amount adjusting device including a light source unit that emits illumination light, a light amount adjusting unit that adjusts an amount of the illumination light, an optical sensor that detects the brightness of the illumination light and the light intensity of each color component of red, green, and blue included in the illumination light, a light-modulation element that light-modulates each of the color components of red, green, and blue included in the illumination light and outputs a projection video, and a gain adjusting unit that adjusts gain values of the individual color components output from the light-modulation element, in which at a first time point, the light amount adjusting unit stores the brightness of the illumination light as the first brightness for the projection video to have a desired brightness, and stores the light intensity of each of the color components of the illumination light as the first light intensity, the gain adjusting unit sets the projection video to have a desired color and sets a gain value of at least one of the individual color components to be a maximum value, and stores the set gain value as a first gain value, at a second time point after the first time point, the light amount adjusting unit adjusts the amount of the illumination light so that the brightness of the illumination light emitted from the light source unit coincides with the first brightness, and calculates a ratio between a second light intensity and the first light intensity, the second light intensity being a light intensity of each of the color components of the illumination light emitted from the light source unit, the gain adjusting unit corrects the gain values based on the ratio between the second light intensity and the first light intensity, and if the corrected gain values exceed the maximum value, reduces the gain values of the individual color components at the same ratio so that the largest gain value among the gain values of the individual color component becomes the maximum value, and the light amount adjusting unit increases the amount of the illumination light.

A second aspect of one or more embodiments provides a projection device including a light source unit that emits illumination light, an illumination optical system into which the illumination light enters from the light source unit, and which emits the illumination light, a projection optical system that projects the illumination light emitted from the illumination optical system onto a screen, a light amount adjusting unit that adjusts the amount of the illumination light, an optical sensor that detects the brightness of the illumination light and the light intensity of each color component of red, green, and blue included in the illumination light, a light-modulation element that light-modulates each of the color components of red, green, and blue included in the illumination light and outputs a projection video, and a gain adjusting unit that adjusts gain values of the individual color components output from the light-modulation element, in which at a first time point, the light amount adjusting unit stores the brightness of the illumination light as a first brightness for the projection video to have a desired brightness, and stores the light intensity of each of the color components of the illumination light as the first light intensity, the gain adjusting unit sets the projection video to have a desired color and sets a gain value of at least one of the individual color components to be a maximum value, and stores the set gain value as a first gain value, at a second time point after the first time point, the light amount adjusting unit adjusts the amount of the illumination light so that the brightness of the illumination light emitted from the light source unit coincides with the first brightness, and calculates a ratio between a second light intensity and the first light intensity, the second light intensity being a light intensity of each of the color components of the illumination light emitted from the light source unit, the gain adjusting unit corrects the gain values based on the ratio between the second light intensity and the first light intensity, and if the corrected gain values exceed the maximum value, reduces the gain values of the individual color components at the same ratio so that the largest gain value among the gain values of the individual color component becomes the maximum value, and the light amount adjusting unit increases the amount of the illumination light.

A third aspect of one or more embodiments provides a light amount adjusting method including, at a first time point, storing the brightness of illumination light emitted from a light source unit as a first brightness for a projection video to have a desired brightness, and storing the light intensity of each color component of red, green, and blue of the illumination light as a first light intensity, setting the projection video to have a desired color and setting a gain value of at least one of the individual color components to be a maximum value, and storing the set gain value as a first gain value, at a second time point after the first time point, adjusting the amount of the illumination light so that the brightness of the illumination light emitted from the light source unit coincides with the first brightness, and calculating a ratio between a second light intensity and the first light intensity, the second light intensity being the light intensity of each of the color components of the illumination light emitted from the light source unit, correcting the gain values based on the ratio between the second light intensity and the first light intensity, and if the corrected gain values exceed the maximum value, reducing the gain values of the individual color components at the same ratio so that the largest gain value among the gain values of the individual color component becomes the maximum value, and increasing the amount of the illumination light.

In accordance with a light amount adjusting device, a projection device, and a light amount adjusting method according to one or more embodiments, it is possible to maintain the brightness and the color balance and to reduce the power consumption of a light source unit.

DETAILED DESCRIPTION

Hereinafter, a light amount adjusting device, a projection device, and a light amount adjusting method according to each embodiment will be described with reference to the drawings.

First Embodiment

Figure 1:
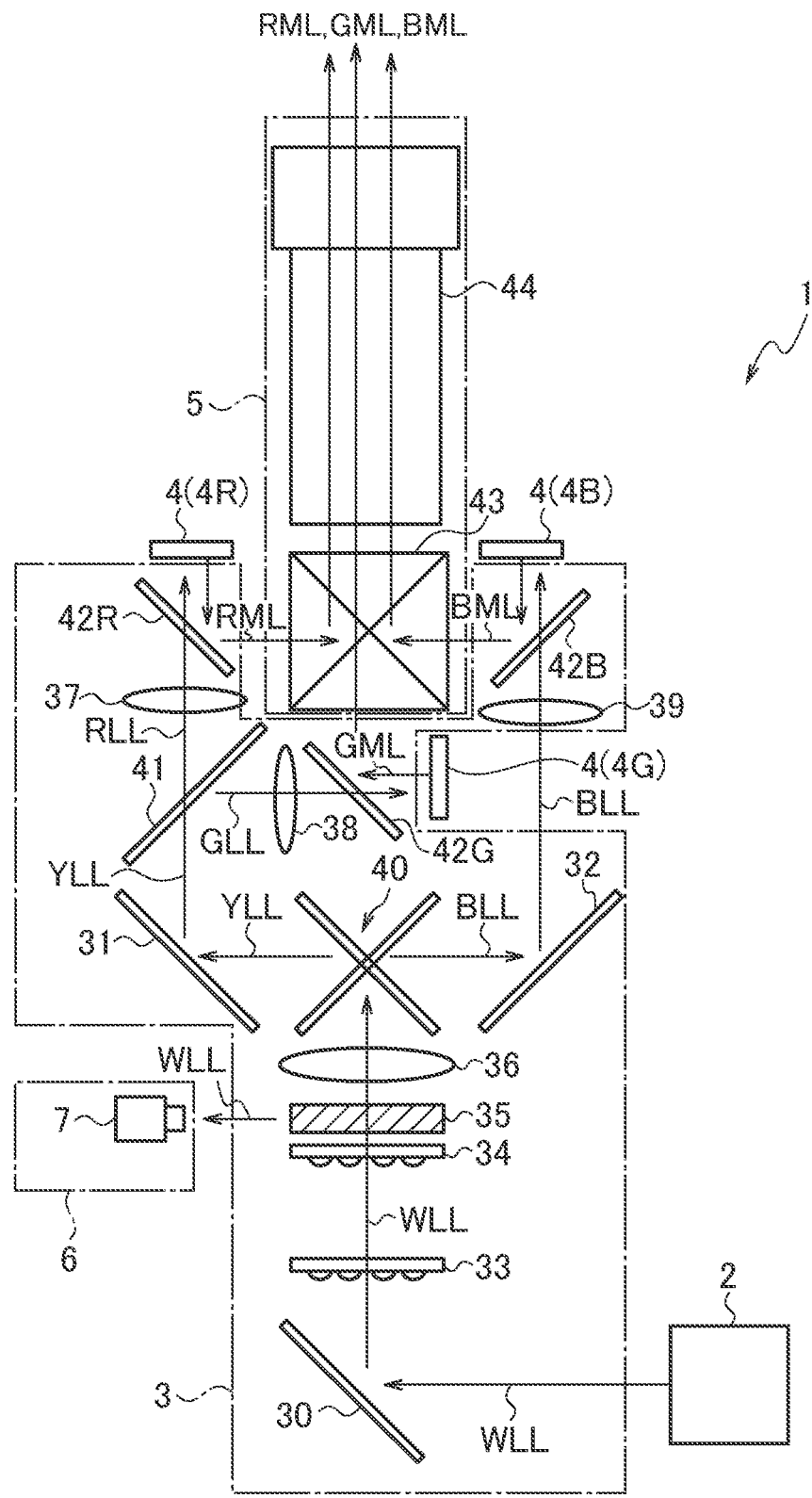
FIG. 1 is a block diagram showing a configuration of a projection device according to a first embodiment.

FIG. 1 is an explanatory diagram showing a configuration of a projection device according to a first embodiment. As shown in FIG. 1, a projection device 1 according to a first embodiment includes a light source unit 2, an illumination optical system 3, light-modulation elements 4 (4R, 4G, and 4B), a projection optical system 5, and a light amount adjusting device 6.

Figure 2:
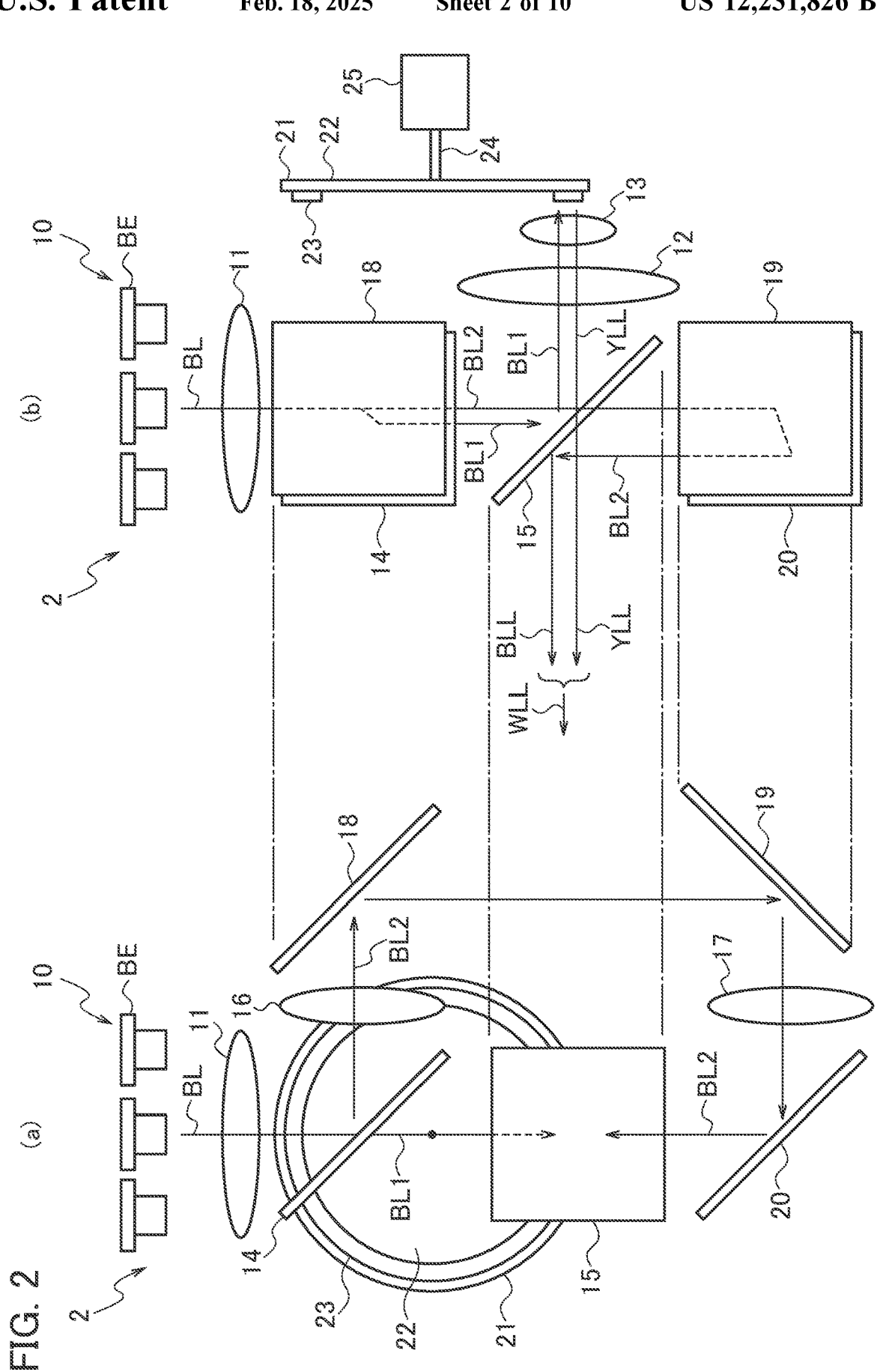
FIG. 2 is a block diagram showing a detailed configuration of a light source unit in the projection device shown in FIG. 1.

FIG. 2 is an explanatory diagram showing a detailed configuration of the light source unit 2 shown in FIG. 1. In FIG. 2, in order to facilitate understanding of the direction in which light passes, FIG. 2(*a*) shows a view seen along the normal direction of a phosphor wheel 22 in the light source unit 2, and FIG. 2(*b*) shows a view in which FIG. 2(*a*) is seen from the lateral direction.

As shown in FIGS. 2(*a*) and 2(*b*), the light source unit 2 includes light sources 10, condenser lenses 11, 12, and 13, a dividing mirror 14, a dichroic mirror 15, lenses 16 and 17, mirrors 18, 19, and 20, and a phosphor unit 21.

The light sources 10 and the phosphor unit 21 constitute an illumination light source. The light sources 10 are composed of, for example, a laser array in which a plurality of blue laser elements BE are arrayed. The light sources 10 emit laser light.

Figure 3:
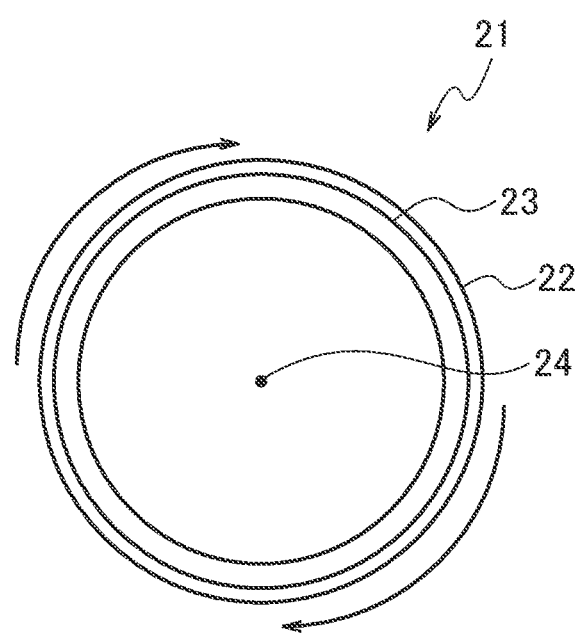
FIG. 3 is an explanatory diagram showing the structure of a phosphor unit.

FIG. 3 is an explanatory diagram showing details of the phosphor unit 21, and with reference to FIGS. 2 and 3, a configuration example of the phosphor unit 21 will be described. The phosphor unit 21 includes a phosphor wheel 22, a phosphor 23, a rotary shaft 24, and a wheel driving unit 25.

The phosphor wheel 22 has, for example, a disk shape. The phosphor 23 is formed on an outer peripheral part of a surface which is a mirror surface of the phosphor wheel 22. By irradiating the phosphor 23 with blue laser light BL, the phosphor 23 is excited and emits yellow light containing a red component and a green component.

The wheel driving unit 25 rotates the phosphor wheel 22 around the rotary shaft 24. While the phosphor wheel 22 is rotated, the phosphor 23 is irradiated with the blue laser light BL. Accordingly, a local temperature rise caused by the irradiation with the blue laser light BL can be dispersed to the entire outer peripheral part of the phosphor wheel 22. This can suppress a temperature rise of the phosphor 23.

The condenser lenses 11, 12, and 13 condense the blue laser light BL as entering light. The dividing mirror 14 divides the blue laser light BL as entering light. Specifically, the dividing mirror 14 reflects a part of the entering blue laser light BL and allows the rest to pass therethrough. Blue laser light BL that has passed through the dividing mirror 14 is set as blue laser light BL1, and blue laser light BL reflected by the dividing mirror 14 is set as blue laser light BL2.

The blue laser light BL1 that has passed through the dividing mirror 14 enters the dichroic mirror 15. The dichroic mirror 15 reflects blue light containing a blue component and allows yellow light having a red component and a green component to pass therethrough. The blue laser light BL1 is reflected by the dichroic mirror 15, further condensed by the condenser lenses 12 and 13, and then used to irradiate the phosphor 23.

The phosphor 23 is excited by the blue laser light BL1 and emits yellow light containing a red component and a green component. The phosphor unit 21 emits yellow light as yellow illumination light YLL by being irradiated with the blue laser light BL1. The yellow illumination light YLL enters the illumination optical system 3 through the condenser lenses 12 and 13 and the dichroic mirror 15.

The blue laser light BL2 reflected by the dividing mirror 14 is used to irradiate the dichroic mirror 15 via a relay optical system having the lenses 16 and 17 and the mirrors 18, 19, and 20. The blue laser light BL2 is reflected by the dichroic mirror 15 and enters the illumination optical system 3 as blue illumination light BLL. That is, white illumination light WLL, which is a mixed light of the yellow illumination light YLL and the blue illumination light BLL enters the illumination optical system 3 from the light source unit 2.

The configuration of the light source unit 2 is not limited to the above configuration, and may be that of any light source that emits white illumination light WLL. For example, a white LED light source or a white lamp light source may be used as the light source unit 2.

Returning to FIG. 1, the illumination optical system 3 includes reflection mirrors 30, 31, and 32, fly-eye lenses 33 and 34, a polarization conversion element 35, and lenses 36 to 39. The illumination optical system 3 further includes a cross dichroic mirror 40, a dichroic mirror 41, and reflection type polarizing plates 42 (in FIG. 1, shown as 42R, 42G, and 42B).

The reflection mirror 30 reflects the illumination light WLL that has entered the illumination optical system 3 toward the fly-eye lenses 33 and 34. The fly-eye lenses 33 and 34 constitute a uniform illumination optical system. The fly-eye lenses 33 and 34 uniformize the illumination distribution of the illumination light WLL with which the light-modulation element 4 is irradiated.

The polarization conversion element 35 converts the illumination light WLL to either one of p-polarized light and s-polarized light. The polarization conversion element 35 converts the illumination light WLL to, for example, s-polarized light. The illumination light that is converted to s-polarized light enters the cross dichroic mirror 40 through the lens 36. The cross dichroic mirror 40 separates the illumination light WLL into the yellow illumination light YLL and the blue illumination light BLL.

The yellow illumination light YLL which is separated from the illumination light WLL by the cross dichroic mirror 40 is reflected by the reflection mirror 31 and then enters the dichroic mirror 41. The dichroic mirror 41 separates the yellow illumination light YLL into red illumination light RLL containing a red component and green illumination light GLL containing a green component.

The dichroic mirror 41 allows the red illumination light RLL to pass therethrough and reflects the green illumination light GLL. The reflection type polarizing plate 42 allows either one of the p-polarized light and the s-polarized light to pass therethrough and reflects the other. For example, the reflection type polarizing plate 42 allows the s-polarized light to pass therethrough and reflects the p-polarized light. The reflection type polarizing plate 42 may be formed of, for example, a wire grid.

In order to distinguish the light-modulation element 4 and the reflection type polarizing plate 42 for each color, the light-modulation element 4 and the reflection type polarizing plate 42 which are irradiated with the red illumination light RLL are set as a light-modulation element 4R and a reflection type polarizing plate 42R. The light-modulation element 4 and the reflection type polarizing plate 42 which are irradiated with the green illumination light GLL are set as a light-modulation element 4G and a reflection type polarizing plate 42G. The light-modulation element 4 and the reflection type polarizing plate 42 which are irradiated with the blue illumination light BLL are set as a light-modulation element 4B and a reflection type polarizing plate 42B.

The red illumination light RLL that has passed through the dichroic mirror 41 enters the reflection type polarizing plate 42R through the lens 37. The s-polarized red illumination light RLL passes through the reflection type polarizing plate 42R and is then used to irradiate the light-modulation element 4R. The light-modulation element 4R light-modulates the red illumination light RLL for each pixel based on the image data of the red component to generate p-polarized red image light RML. The red image light RML is reflected by the reflection type polarizing plate 42R and then enters the projection optical system 5.

The green illumination light GLL reflected by the dichroic mirror 41 enters the reflection type polarizing plate 42G through the lens 38. The s-polarized green illumination light GLL passes through the reflection type polarizing plate 42G and is then used to irradiate the light-modulation element 4G. The light-modulation element 4G light-modulates the green illumination light GLL for each pixel based on the image data of the green component to generate p-polarized green image light GML. The green image light GML is reflected by the reflection type polarizing plate 42G and then enters the projection optical system 5.

The blue illumination light BLL separated from the illumination light by the cross dichroic mirror 40 is reflected by the reflection mirror 32 and then enters the reflection type polarizing plate 42B through the lens 39. The s-polarized blue illumination light BLL passes through the reflection type polarizing plate 42B and is then used to irradiate the light-modulation element 4B. The light-modulation element 4B light-modulates the blue illumination light BLL for each pixel based on the image data of the blue component to generate p-polarized blue image light BML. The blue image light BML is reflected by the reflection type polarizing plate 42B and then enters the projection optical system 5.

The projection optical system 5 has a color combining prism 43 and a projection lens 44. The red image light RML, the green image light GML, and the blue image light BML that have entered the projection optical system 5 are combined by the color combining prism 43, and are magnified and projected to a projection object medium such as a screen by the projection lens 44 as a full-color display image.

Figure 4:
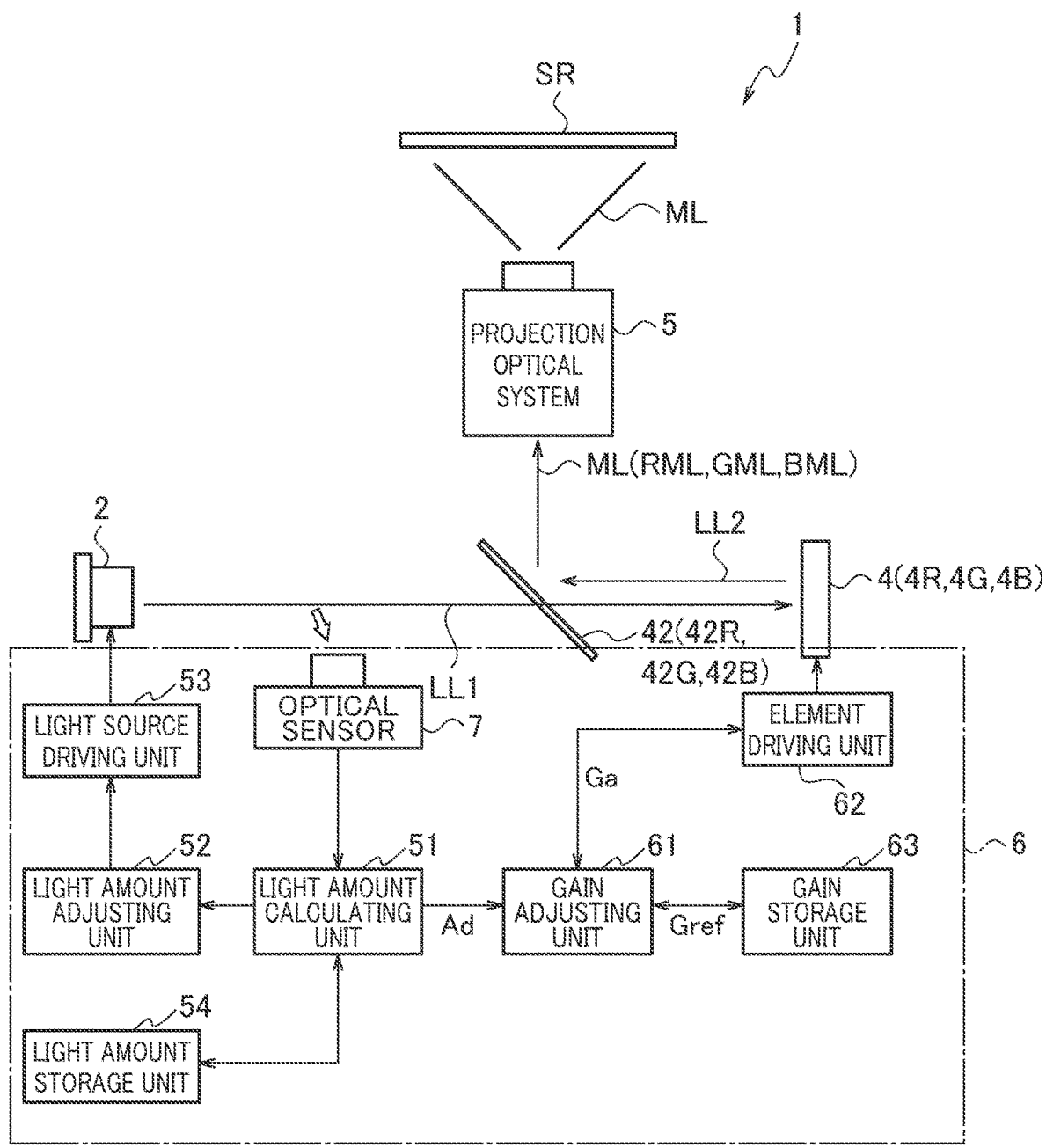
FIG. 4 is a block diagram showing a detailed configuration of a light amount adjusting device of the projection device shown in FIG. 1.

Next, a detailed configuration of a light amount adjusting device 6 will be described with reference to FIG. 4. A reflection type polarizing plate 42 shown in FIG. 4 is a simplified version of the reflection type polarizing plate 42 shown in FIG. 1 (42R, 42G, and 42B). A reference numeral LL1 shown in FIG. 4 indicates each color light (RLL, GLL, and BLL) that enters each reflection type polarizing plate 42 (42R, 42G, and 42B). A light-modulation element 4 of FIG. 4 is a simplified version of the light-modulation element 4 shown in FIG. 1 (4R, 4G, and 4B). A projection optical system 5 shown in FIG. 4 is a simplified version of the projection optical system 5 shown in FIG. 1.

The light amount adjusting device 6 includes an optical sensor 7, a light amount calculating unit 51, a light amount adjusting unit 52, a light source driving unit 53, a light amount storage unit 54, a gain adjusting unit 61, an element driving unit 62, and a gain storage unit 63.

The light amount calculating unit 51, the light amount adjusting unit 52, the light source driving unit 53, the gain adjusting unit 61, and the element driving unit 62 may be constituted by executing a program on a CPU (central processing unit) which is mounted in the light amount adjusting device 6, or may be constituted by a hardware circuit which operates by partial or entire units cooperating with one another.

As shown in FIG. 1, the optical sensor 7 is disposed in the vicinity of an optical path in a range in which the illumination light WLL is emitted from the light sources 10 of the light source unit 2 and enters the cross dichroic mirror 40. The optical sensor 7 is preferably disposed on an optical path in which light of each color component is mixed. The optical sensor 7 is disposed, for example, in the vicinity of the polarization conversion element 35 (see FIG. 1). The optical sensor 7 is disposed at a position apart from an optical path at which the optical sensor 7 can detect the illumination light WLL and also at a position at which the leakage light of the polarization conversion element 35 can be efficiently detected.

Furthermore, the optical sensor 7 detects the light intensity of each of the red component (R), the green component (G), and the blue component (B) contained in the illumination light emitted from the light sources 10. Still furthermore, the optical sensor 7 detects the brightness of white light composed of each of the color components.

The brightness of the illumination light detected by the optical sensor 7 can be calculated by means of the following formula (1) based on detection values of the light intensities of the individual color components of R, G, and B.

$$C = IR \times CR + IG \times CG + IB \times CB \quad (1)$$

where C: brightness, CR, CG, and CB: detection values of light intensities of RGB, and IR, IG, and IB: conversion coefficients (IR+IG+IB=1)

Alternatively, the light intensity of green (G) may be simply employed as the brightness "C". That is, IG=1, IR=0, and IB=0 may be used.

The illumination light LL1 shown in FIG. 4 passes through the reflection type polarizing plate 42 and is then used to irradiate the light-modulation element 4. The light-modulation element 4 light-modulates the illumination light LL1 based on the input image data to generate image light ML.

The light amount calculating unit 51 acquires the light intensity of each color component detected by the optical sensor 7. The light amount calculating unit 51 stores, in the light amount storage unit 54, pieces of data of the light intensity and the brightness in an initial state (at a first time point such as at the time of factory shipment). Further, the light amount storage unit 54 stores pieces of data of the light intensity of each color component and brightness at a time after the elapse of a time from the initial state (at a second time point after the first time point).

The light amount calculating unit 51 further calculates the ratio between the light intensity of each color component currently detected and the light intensity in the initial state or the light intensity of each color component detected the previous time. The light amount calculating unit 51 calculates a gain adjustment value Ad for correcting a gain value when the light-modulation element 4 (4R, 4G, and 4B) is driven based on the ratio, and outputs the value to the gain adjusting unit 61.

The gain storage unit 63 is constituted of a non-volatile memory such as a ROM and stores an initial gain value Gref used for the operation by the gain adjusting unit 61. Further, if a new gain value is set by means of a process described later in response to the elapse of time from when the light intensity is in the initial state or from when the light intensity is detected the previous time, the gain storage unit 63 stores the new gain value.

The gain adjusting unit 61 corrects a gain value of image data by using the initial gain value Gref read from the gain storage unit 63 and the gain adjustment value Ad. The gain value is the gain of image data supplied to the light-modulation element 4 when the element driving unit 62 drives the light-modulation element 4.

The gain adjusting unit 61 can adjust the brightness of a projected image based on the image data, for example, by multiplying the initial gain value Gref and the gain adjustment value Ad by a gradation value of each pixel in the image data. The gain adjusting unit 61 may adjust the brightness of a projected image based on the image data, for example, by adding or subtracting the initial gain value Gref and the gain adjustment value Ad to or from a gradation value of each pixel in the image data. Since image data and the brightness of the projected image are not necessarily in a linear relationship, it is desirable to determine the initial gain value Gref by considering a gamma characteristic of the light-modulation element 4.

The gain adjusting unit 61 sets the following formula (2) in order to equalize the color components of R, G, and B having the brightness of the projection light between when they are in an initial state (at a first time point) and when they are detected (at a second time point).

$$CR0 * XR0\hat{\ }\gamma = CR1 * XR1\hat{\ }\gamma$$

$$CG0 * XG0\hat{\ }\gamma = CG1 * XG1\hat{\ }\gamma$$

$$CB0 * XB0\hat{\ }\gamma = CB1 * XB1\hat{\ }\gamma \quad (2)$$

In the formula (2), CR0, CG0, and CB0 indicate the brightness of red, green, and blue in an initial state. CR1, CG1, and CB1 indicate the brightness of red, green, and blue at the time of the current measurement. XR0, XG0, and XB0 indicate gain values of red, green, and blue in initial states. XR1, XG1 and XB1 indicate gain values of red, green, and blue which are set at the time of the current measurement. The symbol "^" indicates a power, and "γ" indicates a numerical value (for example, 2.2) of a gamma characteristic.

Then, the following formula (3) is obtained from the above formula (2).

$$XR1 = XR0(CR0/CR1)\hat{\ }(1/\gamma)$$

$$XG1 = XG0(CG0/CG1)\hat{\ }(1/\gamma)$$

$$XB1 = XB0(CB0/CB1)\hat{\ }(1/\gamma) \quad (3)$$

Then, the gain value of each color component can be calculated based on the above formula (3).

The element driving unit 62 drives the light-modulation element 4 (4R, 4G, and 4B) by setting gain values to the gain values set by the gain adjusting unit 61.

The light amount adjusting unit 52 outputs a command signal to the light source driving unit 53 so that the light amount of the illumination light emitted from the light source unit 2 becomes the light amount calculated by the light amount calculating unit 51. A process for changing a target value for the brightness is performed in accordance with the transmittance between the position of the optical sensor 7 and the projection lens 44 (see FIG. 1). In order not to change the brightness of the projection light, the following formula (4) needs to be held.

$$C(t) * T(t) = C0 * T(0) \quad (4)$$

where C0 and T(0) indicate the brightness and the transmittance in an initial state, and C(t) and T(t) indicate the brightness and the transmittance at time t.

The formula (5) can be obtained by modifying the formula (4).

$$C(t) = C0 * T(0)/T(t) \quad (5)$$

Then, the light amount is calculated by applying the formula (5) to the light amount of each color component of R, G, and B. If the change ratio of the transmittance is equal among the individual color components of R, G, and B, the coefficient "T(0)/T(t)" shown in the formula (5) is equal among the individual color components of R, G, and B. On the other hand, if the transmission spectrum changes and the individual color components of R, G, and B have different transmittances, the above described coefficients take different numerical values among the individual color components of R, G, and B.

The light source driving unit 53 outputs a control signal to the light source unit 2 based on the command signal output by the light amount adjusting unit 52. Specifically, light source driving unit 53 outputs a control signal for adjusting the increase or decrease of the light amount of the illumination light of the white level emitted from the light source unit 2.

Next, the processing operation of a projection device 1 according to a first embodiment constituted as described above will be described with reference to flowcharts shown in FIGS. 5 to 9.

Figure 5:
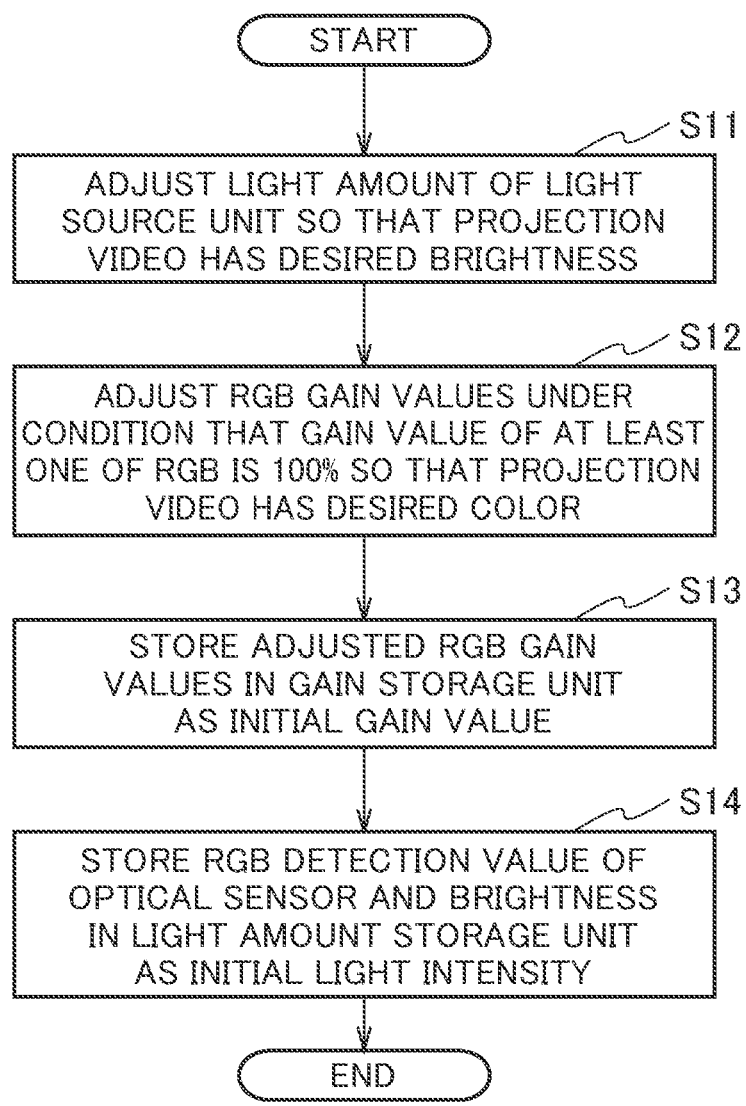
FIG. 5 is a flowchart showing a processing procedure of an initial setting in a light amount adjusting device according to a first embodiment.

FIG. 5 is a flowchart showing the processing procedure for initializing the light amount of the light source unit 2 and a gain value of each color component of R, G, and B in the projection device 1 according to a first embodiment, for example, at the time when the use of the projection device 1 is started (at a first time point). In each embodiment, an example in which the time when the use of the projection device 1 is started is set as a first time point is described, but a light amount adjusting device, a projection device, and a light amount adjusting method according to each embodiment are not limited thereto.

First, in step S11 of FIG. 5, the light amount adjusting unit 52 detects the brightness of the video projected by the projection device 1, and adjusts the brightness of the illumination light emitted from the light sources 10 such that the brightness becomes the desired brightness. In this adjustment, the user visually recognizes an image obtained by projecting, on the screen, the image projected from the projection device 1, to set the brightness to the desired brightness. Alternatively, the brightness may be detected and set to the desired brightness by using a dedicated measuring instrument. In this case, the brightness is set such that the amount of light emitted from the light sources 10 becomes an output of less than 100%.

In step S12, the gain adjusting unit 61 detects each color component of red (R), green (G), and blue (B) of the video projected by the projection device 1, and sets a gain value of the light-modulation element 4 (4R, 4G, and 4B) to obtain a desired color. Further, the gain value of each color component is adjusted such that the gain value of at least one of the individual color components of R, G, and B becomes a maximum value (for example, 100%). The "maximum value" means not only a value of 100%, but also a numerical value close to 100%. The same applies to a "maximum value" shown below.

In step S13, the gain adjusting unit 61 stores, in the gain storage unit 63, the gain value of each color component after adjustment as an initial gain (a first gain value).

In step S14, the light amount calculating unit 51 stores, in the light amount storage unit 54, the light intensity of each color component of red, green, and blue as an initial light intensity (a first light intensity). Further, the light amount calculating unit 51 stores, in the light amount storage unit 54, the brightness of the light source unit 2 (first brightness) as an initial light amount. Thereafter, this process is ended.

Next, a processing procedure for adjusting the gain value of each color component of R, G, and B by means of the projection device 1 according to a first embodiment will be described. If a certain amount of time elapses after the use of the projection device 1 is started, the amount of light emitted from the light sources 10 and the color balance of the projection video are changed due to changes with time, changes in the environment, and variations in each individual. Therefore, it is necessary to correct the change of the light amount and the change of the color balance at a time after the elapse of time from an initial state or the previous measurement (a second time point after a first time point). A processing procedure for adjusting each gain value of R, G, and B will be described below with reference to a flowchart shown in FIG. 6.

In step S31, the light amount adjusting unit 52 sets, as the current light amount (the light amount at a second time point), the light amount of the illumination light emitted from the light sources 10 that is detected by the optical sensor 7. Then, the light amount adjusting unit 52 compares the light amount currently detected with the initial light amount (the first brightness) described above, and adjusts the light amount output from the optical sensor 7 such that the detected light amount and the initial light amount coincide with each other. For example, the ratio between the initial light amount and the current light amount is calculated, and the light amount of the irradiation light emitted from the light sources 10 is adjusted such that the light amount increases by this ratio.

In step S32, the light amount calculating unit 51 acquires the light intensity (the current light intensity) of each component of R, G, and B detected by the optical sensor 7, and calculates the ratio between the light intensity and the initial light intensity stored in the light amount storage unit 54. The gain value of each color component in the gain adjusting unit 61 is changed based on the calculated ratio.

For example, it is assumed that the initial light intensity (first light intensity) of each color component of R, G, and B stored in the light amount storage unit 54 is (R200, G300, and B250) and the light intensity (second light intensity) of each color component of R, G, and B currently detected by the optical sensor 7 is (R250, G310, and B150). In this case, in order to correct the change in the light intensity of each color component, the ratio between the initial light intensity and the current light intensity is calculated, and the gain value of each color component of R, G, and B is changed in accordance with the calculated ratio.

Specifically, it is necessary to brighten the brightness 0.80 times (=200/250) for the red component (R), 0.97 times (=300/310) for the green component (G), and 1.67 times (=250/150) for the blue component (B). Therefore, correction is performed by multiplying each gain value of R, G, and B by numerical values in which the brightness becomes "0.80 times," "0.97 times," and "1.67 times" brighter. For example, correction is performed by multiplying each gain value by a numerical value determined in consideration of a gamma characteristic of an optical conversion element which will be described later.

In step S33, the gain adjusting unit 61 determines whether the calculated gain values of the individual color components of R, G, and B are all less than 100%. If all of the gain values are less than 100%, the process proceeds to step S34, otherwise the process proceeds to step S35.

In step S34, the gain adjusting unit 61 performs a process (first process) for adjusting a gain value while maintaining the ratio of the gain values of the individual color components of R, G, and B so that the maximum value of the gain values of the individual color components of R, G, and B is 100%. Details of the first process will be described later with reference to FIG. 7.

In step S35, the gain adjusting unit 61 determines whether at least one of the calculated gain values of the individual color components of R, G, and B is 100% (the maximum value). If at least one of the gain values is 100%, the process proceeds to step S37, otherwise the process proceeds to step S36.

In step S36, the gain adjusting unit 61 performs a process (second process) for adjusting a gain value while maintaining the ratio of the individual gain values of R, G, and B so that the maximum value of the gain values of the individual color components of R, G, and B becomes 100%. Details of the second process will be described later with reference to FIG. 8.

In step S37, the gain adjusting unit 61 performs a third process. Details of the third process will be described later with reference to FIG. 9. Thereafter, this process is ended.

Next, with reference to the flowchart shown in FIG. 7, a detailed processing procedure of the first process shown in step S34 of FIG. 6 will be described.

As a result of the adjustment of each gain value shown in step S32 of FIG. 6, each gain value of each color component which was 100% at the time of the initial setting decreases, and the gain values may fall below 100% in all the color components of R, G, and B. In this case, even if each adjusted gain value is applied as it is, the brightness and color of the projection video can be maintained equal to those in the initial state.

However, since each gain value falls below 100%, the amount of light emitted from the light-modulation element 4 is reduced, and thus it is necessary to increase the output of the light sources 10 by the amount of the reduction. Therefore, the efficiency is lowered. In other words, although the output of the light sources 10 can be reduced if not in the above situation, more output is required than necessary. This is inefficient and shortens the life of the light sources 10.

Figure 7:
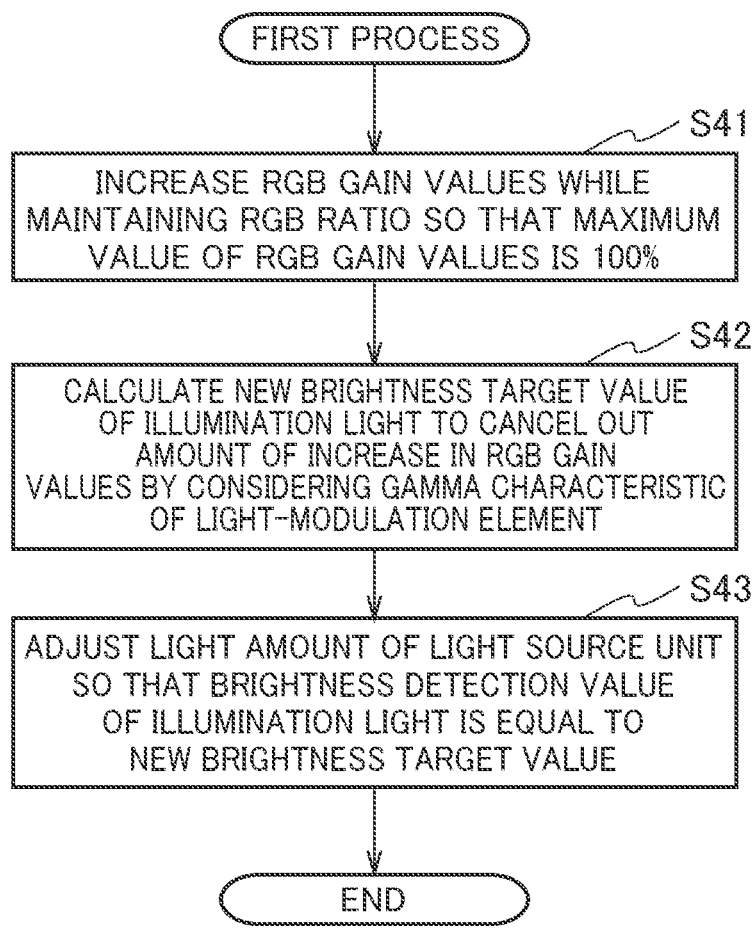
FIG. 7 is a flowchart showing a detailed processing procedure of the first process shown in FIG. 6.

In order to solve the above, in step S41 of FIG. 7, the gain adjusting unit 61 increases the gain value of at least one color component to 100% while maintaining the balance of each color component of R, G, and B. The light amount of the light source unit 2 is reduced by the amount of the increase.

As a specific example, suppose that the maximum gain value of a color component among the gain values of the individual color components of R, G, and B decreases from 100% to 90%. In this case, the gain values of the individual color components of R, G, and B are multiplied by the ratio (100/90=1.1). As a result, the gain value of at least one color component among the individual color components of R, G, and B is set to 100%. The gain values of the other remaining color components are also increased at the same ratio. Therefore, the entire brightness can be increased while maintaining the balance of the individual color components of R, G, and B.

In step S42, the light amount calculating unit 51 calculates the amount of the increase of the brightness due to an increase in the gain value of each color component of R, G, and B.

In step S43, the light amount adjusting unit 52 reduces the output of the light sources 10 so as to cancel out the amount of the increase of the brightness. As a result, the power consumption of the light sources 10 can be reduced while maintaining the brightness and color of the projection video. Further, by reducing the output of the light sources 10, the deterioration in the light source unit 2 can be prevented and the life of the light source unit 2 can be prolonged.

Gain values and the brightness of the projection video are not normally in a linear relationship. Therefore, the output values of the light sources 10 are determined in consideration of a gamma characteristic of the light-modulation element 4. In the case of a gamma characteristic such as a power of 2.2, a target value for the brightness may be obtained by calculation. Alternatively, a gain/brightness conversion table may be stored in the light amount storage unit 54, and the brightness may be set by referring to the table.

Next, with reference to the flowchart shown in FIG. 8, a detailed processing procedure of the second process shown in step S36 of FIG. 6 will be described.

Figure 6:
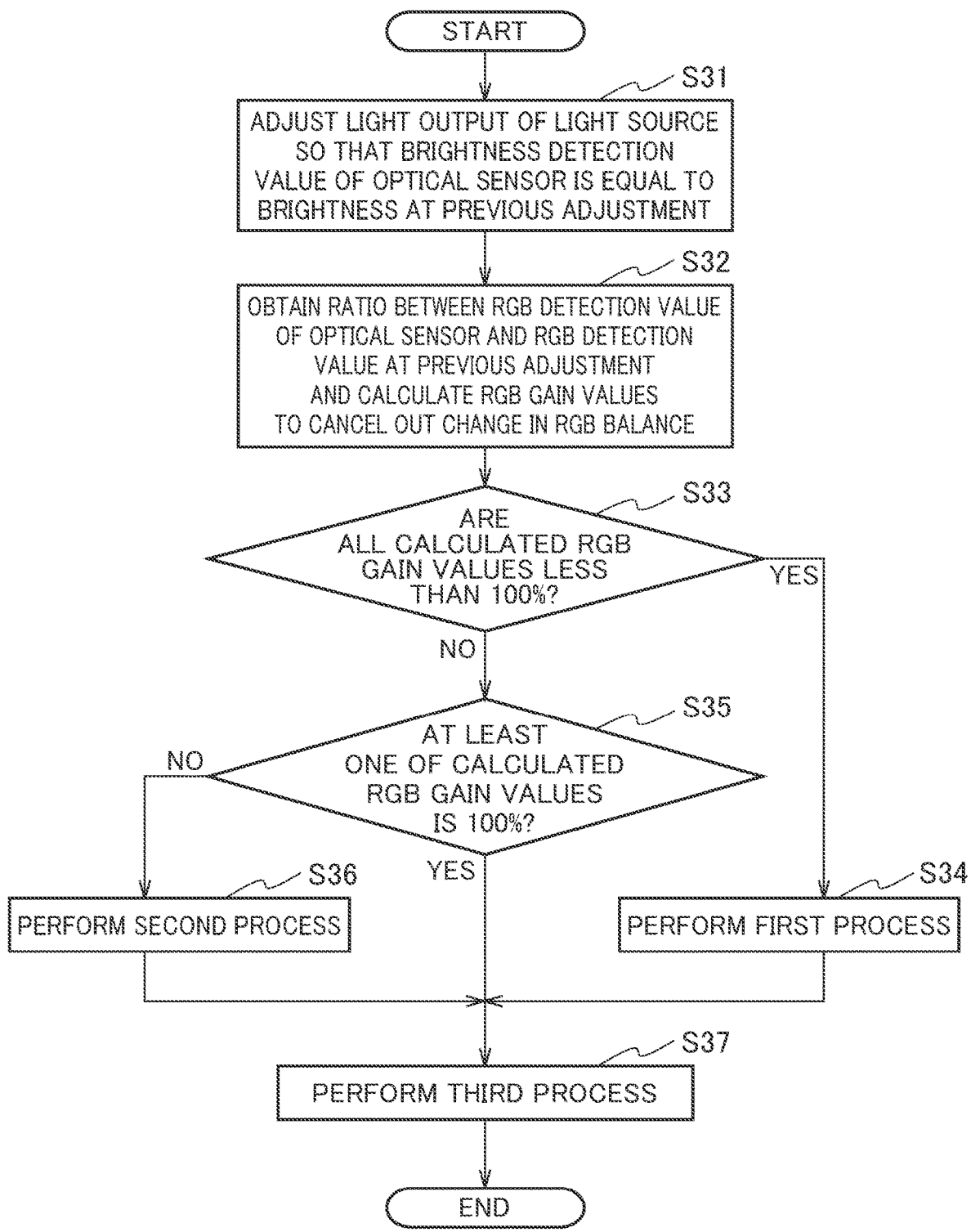
FIG. 6 is a flowchart showing a processing procedure for adjusting RGB gains when changes with time or changes in the environment occur in the light amount adjusting device according to a first embodiment.

As a result of the adjustment of the gain values shown in step S32 of FIG. 6, the gain values of the individual color components of R, G, and B increase, and the gain value of at least one color component may exceed 100%. Each light-modulation element 4 is not able to set a gain value exceeding 100%. Therefore, by performing the following process, the gain value of each color component is adjusted so that the maximum gain value is 100%.

Figure 8:
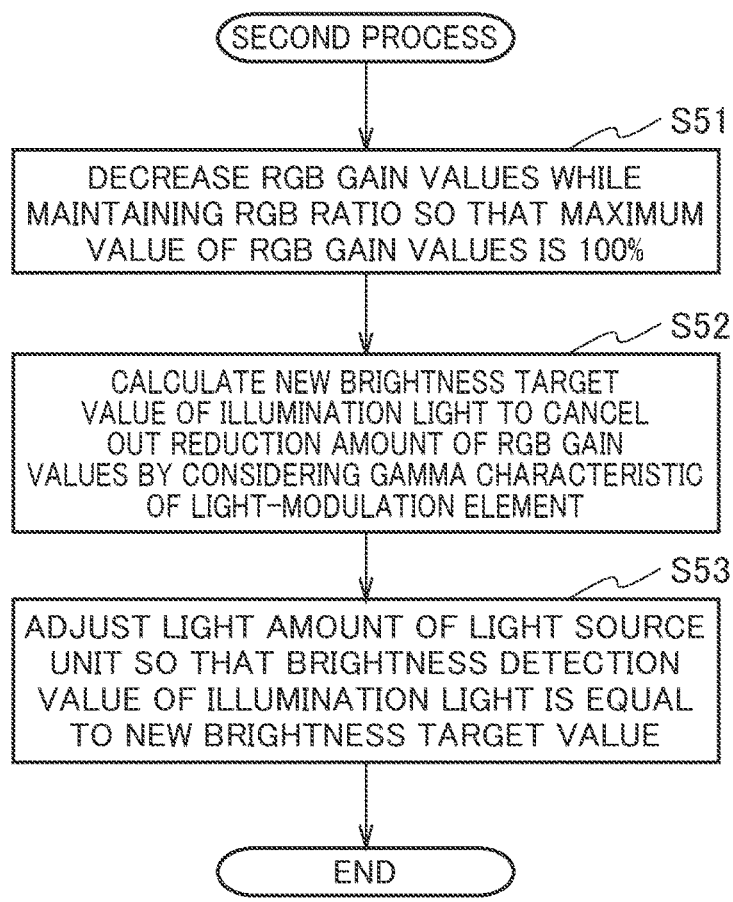
FIG. 8 is a flowchart showing a detailed processing procedure of the second process shown in FIG. 6.

First, in step S51 of FIG. 8, the gain adjusting unit 61 decreases the gain values until the maximum gain value among the gain values of the individual colors becomes 100% while maintaining the balance of each color component of R, G, and B. Specifically, as in step S41 of FIG. 7 described above, the ratio between an initial gain value and the current gain value is calculated. Then, the gain value of each color component of R, G, and B is multiplied by this ratio to reduce the gain values so that the maximum gain value becomes 100% while maintaining the entire color balance.

In step S52, the light amount calculating unit 51 calculates the amount of the reduction in the brightness of the illumination light due to the decrease in the gain value of each color component of R, G, and B.

In step S53, the light amount adjusting unit 52 increases the light amount of the light sources 10 so as to cancel out the amount of the reduction of the brightness. The light amount of the light sources 10 can be increased, because, as described above, the light amount of the light sources 10 is set to be less than 100% at the time of the initial setting. As a result, the entire color balance can be maintained while maintaining the brightness and color of the projection video.

Figure 9:
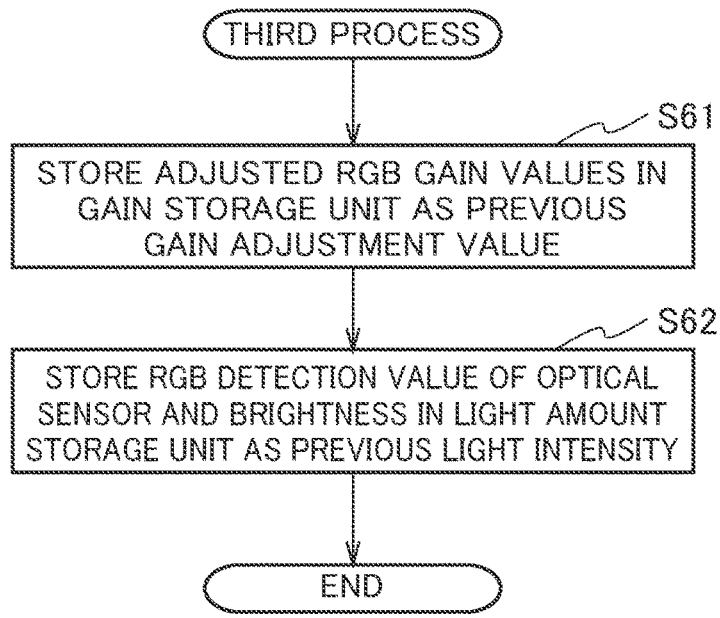
FIG. 9 is a flowchart showing a detailed processing procedure of the third process shown in FIG. 6.

Next, with reference to the flowchart shown in FIG. 9, a detailed processing procedure of the third process shown in step S37 of FIG. 6 will be described.

In a step S61, the gain adjusting unit 61 stores a gain value of each color component in the gain storage unit 63 as the previous gain value. Specifically, if the first process is performed in step S34 of FIG. 6, the current gain value adjusted by means of the first process is newly stored in the gain storage unit 63 as the previous gain value. If the second process is performed in step S36 of FIG. 6, the current gain value adjusted by means of the second process is newly stored in the gain storage unit 63 as the previous gain value. Further, if YES is determined in step S35 and the gain values are not adjusted, an initial gain value is newly stored in the gain storage unit 63 as the previous gain value.

In step S62, the light amount calculating unit 51 stores, in the light amount storage unit 54, the brightness and the light intensity of each color component of the illumination light detected by the optical sensor 7. Specifically, if the first process is performed in step S34 of FIG. 6, the light intensity of each color component measured when the first process is performed is newly stored in the light amount storage unit 54 as the previous light intensity. The light intensity of each color component measured when the second process is performed in step S36 of FIG. 6 is newly stored in the light amount storage unit 54 as the previous light intensity. Further, if YES is determined in step S35 and no change has occurred in the light intensity, the initial light intensity is newly stored in the light amount storage unit 54 as the previous light intensity.

A gain value newly stored in the gain storage unit 63 is used as the previous gain value (a first gain value) when the next light amount control is performed. The light intensity of each color component stored in the light amount storage unit 54 is used as the previous light intensity (first light intensity) when the next light amount control is performed.

As described above, in the projection device 1 using the light amount adjusting device according to a first embodiment, the brightness and color of the projection video can be maintained constant even if the brightness and color of the projection video are changed due to changes with time or changes in the environment.

Further, since at least one of the gain values of the individual color components of R, G, and B is adjusted to be 100%, it is possible to prevent the amount of light emitted from the light sources 10 from becoming larger than necessary. As a result, the power consumption of the light source unit 2 can be reduced and the life of the light source unit 2 can be prolonged.

Modified Example of First Embodiment

In a first embodiment described above, an example in which the optical sensor 7 of the light amount adjusting device 6 is disposed in the vicinity of the polarization conversion element 35 has been described. However, the position in which the optical sensor 7 is disposed may be a position in the vicinity of an optical path in a range in which the illumination light is emitted from the light source unit 2 and enters the cross dichroic mirror 40, the position not affecting the light-modulation element 4 (4R, 4G, and 4B).

Figure 10:
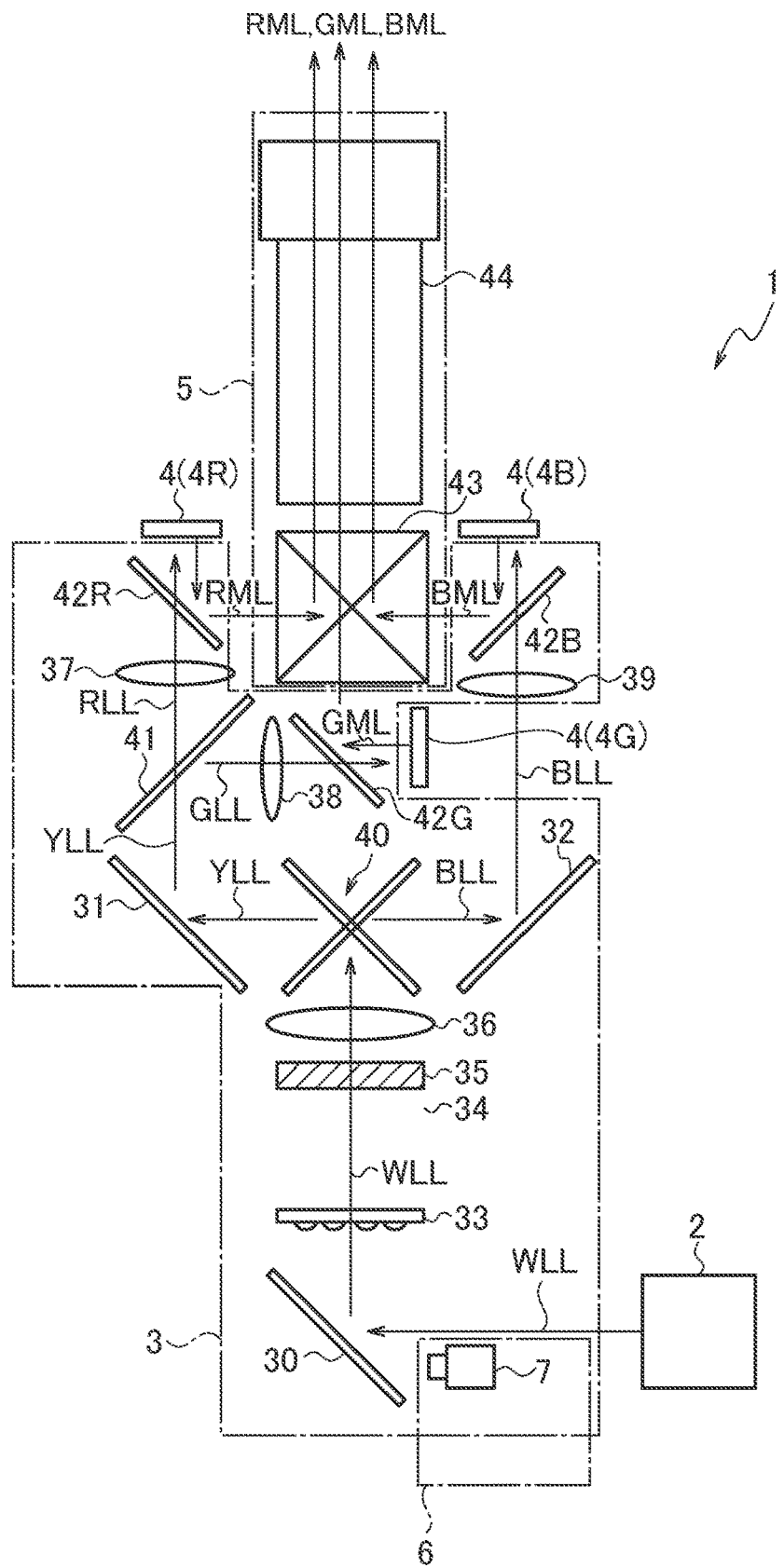
FIG. 10 is a block diagram showing a configuration of a projection device according to a modified example of a first embodiment.

For example, as shown in FIG. 10, the optical sensor 7 may be disposed closer to the light source unit 2 (for example, in the vicinity of the reflection mirror 30) than the fly-eye lens 33. If the optical sensor 7 is disposed closer to the light source unit 2 than the fly-eye lens 33, even if the optical sensor 7 is disposed at a position that affects the illumination light, there is an advantage that the fly-eye lens 33 can uniformize the illumination distribution of the affected illumination light with which the light-modulation element 4 is irradiated.

Second Embodiment

Next, a second embodiment will be described. Since the device configuration is the same as that of FIGS. 1 to 4, the description of the device configuration is omitted. In an above described first embodiment, the first process (S34) or the second process (S36) shown in FIG. 6 is performed to calculate the gain value of each color component of R, G, and B and the light intensity of each color component of R, G, and B, and then the third process (S37) is performed to store each piece of data.

Figure 11:
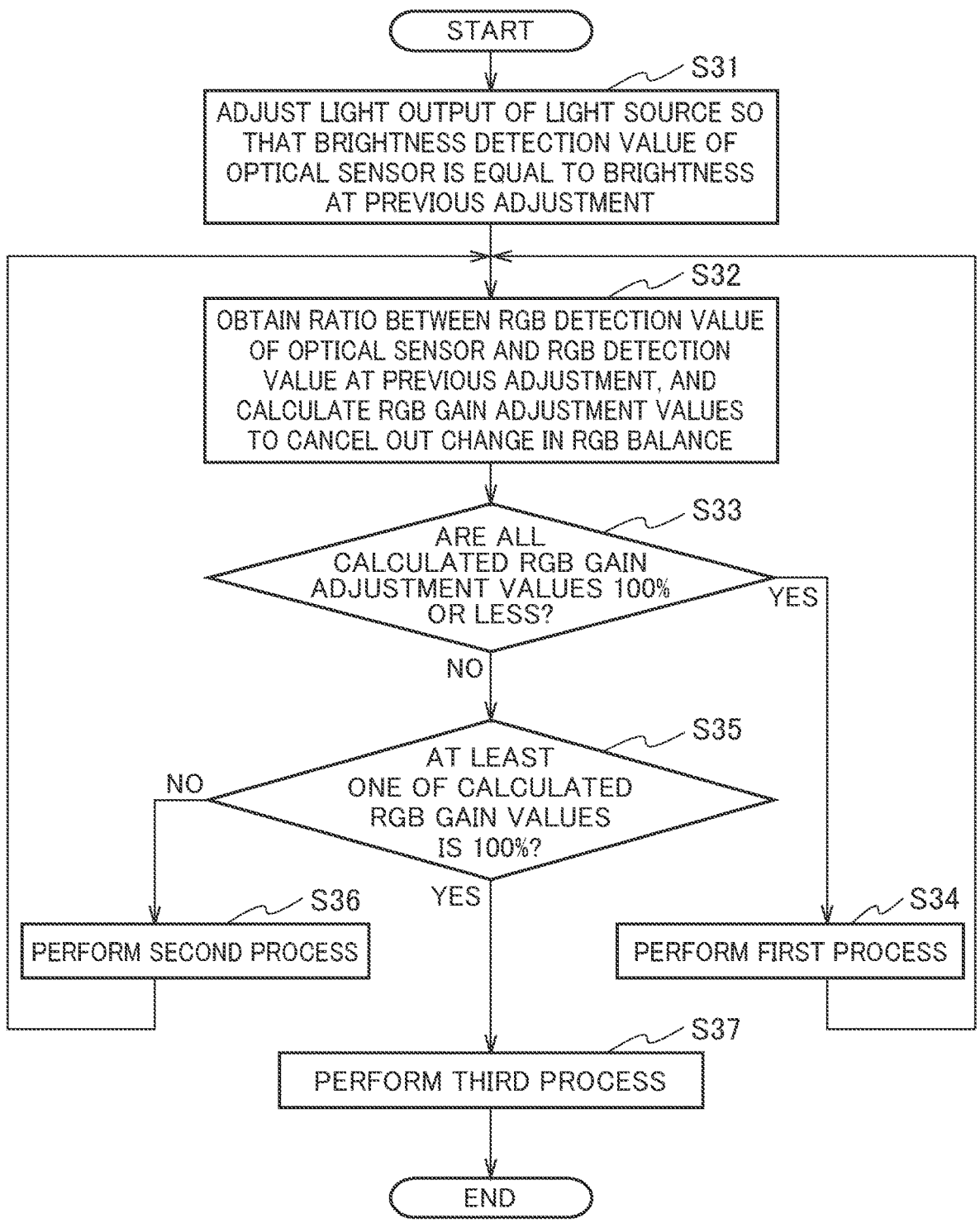
FIG. 11 is a flowchart showing a processing procedure for adjusting RGB gains when changes with time or changes in the environment occur in a light amount adjusting device according to a second embodiment.

Meanwhile, in a second embodiment, as shown in FIG. 11, after the first process (S34) and the second process (S36) are performed, the process returns to step S32 again, and the third process is performed after at least one of the gain values of the individual color components of R, G, and B becomes 100%.

That is, if the amount of the illumination light emitted from the light sources 10 changes, not only the brightness but also the color may change depending on the characteristics of the light sources 10. Therefore, by performing the process of step S32 again after performing the first process and the second process, the brightness and color of the illumination light of the light sources 10 can be stably controlled.

If the light-modulation element 4 (4R, 4G, and 4B) is a reflection type liquid crystal, there is return light which affects the detection value of the optical sensor 7, the return light being reflected by the light-modulation element 4 and returning to the optical path side where the optical sensor 7 is located. Therefore, the amount of the return light varies depending on the display image of the light-modulation element 4. In order to avoid the above, it is desirable to display the same image on the light-modulation element 4 every time the light amount is measured.

Further, the brightness and color may be adjusted manually when the user is not satisfied with changes in the brightness and color, or may be adjusted automatically at a desired timing in response to the passage of time, changes in the environment, and the like.

Further, in each embodiment described above, an example in which light of each color component of R, G, and B is emitted by using the blue laser element BE and the phosphor 23 has been described. However, the present disclosure is not limited to this, and a light source which emits light of each color component of R, G, and B may be used.

Although one or more embodiments have been described above, it should not be understood that the descriptions and drawings forming part of this disclosure are intended to limit the invention. Various alternative embodiments, examples, and operating techniques will become apparent to those skilled in the art from this disclosure.

What is claimed is:

1. A light amount adjusting device comprising:
a light source unit that emits illumination light;
a light amount adjusting unit that adjusts an amount of the illumination light;
an optical sensor that detects a brightness of the illumination light and a light intensity of each of all color components of red, green, and blue included in the illumination light;
a light-modulation element that light-modulates each of the color components of red, green, and blue included in the illumination light and outputs a projection video; and
a gain adjusting unit that adjusts gain values of each of the color components output from the light-modulation element, wherein
at a first time point,
the light amount adjusting unit stores the brightness of the illumination light as a first brightness for the projection video to have a desired brightness, and stores a light intensity of each of the color components of the illumination light as a first light intensity,
the gain adjusting unit sets the projection video to have a desired color and sets a gain value of at least one of the color components to be a maximum value, and stores the set gain value as a first gain value, at a second time point after the first time point, the light amount adjusting unit adjusts the amount of the illumination light so that the brightness of the illumination light emitted from the light source unit coincides with the first brightness, and calculates a ratio between a second light intensity and the first light intensity, the second light intensity being a light intensity of each of the color components of the illumination light emitted from the light source unit, the gain adjusting unit corrects the gain values based on the ratio between the second light intensity and the first light intensity, and if the corrected gain values exceed the maximum value, reduces the gain values of the color components at the same ratio so that the largest gain value among the gain values of the color components becomes the maximum value, and the light amount adjusting unit increases the amount of the illumination light.

2. The light amount adjusting device according to claim 1, wherein after the gain values of the color components are reduced at the same ratio, the light amount adjusting unit increases the amount of the illumination light based on a gamma characteristic so as to compensate for a decrease in a brightness of the projection video due to reduction in the gain values of the color components.

3. The light amount adjusting device according to claim 1, wherein as a result of correcting, by the gain adjusting unit, the gain values so that the second light intensity coincides with the first light intensity, if the gain values of all of the color components become less than the maximum value, each of the gain values is increased so that a gain value of at least one of the color components becomes the maximum value, and the light amount adjusting unit reduces the amount of the illumination light.

4. The light amount adjusting device according to claim 3, wherein after each of the gain values is increased so that the gain value of at least one of the color components becomes the maximum value, the light amount adjusting unit reduces the amount of the illumination light based on the gamma characteristic so as to compensate for an increase in the brightness of the projection video due to the increase in the gain values of the color components.

5. The light amount adjusting device according to claim 1, wherein the light amount adjusting unit sets the amount of the illumination light emitted from the light source unit to less than 100% at the first time point.

6. The light amount adjusting device according to claim 1, wherein the first time point is at a time of initial setting.

7. A projection device comprising:

a light source unit that emits illumination light;

an illumination optical system into which the illumination light enters from the light source unit, and which emits the illumination light;

a projection optical system that projects the illumination light emitted from the illumination optical system onto a screen;

a light amount adjusting unit that adjusts an amount of the illumination light;

an optical sensor that detects a brightness of the illumination light and a light intensity of each of all color components of red, green, and blue included in the illumination light;

a light-modulation element that light-modulates each of the color components of red, green, and blue included in the illumination light and outputs a projection video; and a gain adjusting unit that adjusts gain values of each of the color components output from the light-modulation element, wherein at a first time point, the light amount adjusting unit stores the brightness of the illumination light as a first brightness for the projection video to have a desired brightness, and stores a light intensity of each of the color components of the illumination light as a first light intensity, the gain adjusting unit sets the projection video to have a desired color and sets a gain value of at least one of the color components to be a maximum value, and stores the set gain value as a first gain value, at a second time point after the first time point, the light amount adjusting unit adjusts the amount of the illumination light so that the brightness of the illumination light emitted from the light source unit coincides with the first brightness, and calculates a ratio between a second light intensity and the first light intensity, the second light intensity being a light intensity of each of the color components of the illumination light emitted from the light source unit, the gain adjusting unit corrects the gain values based on the ratio between the second light intensity and the first light intensity, and if the corrected gain values exceed the maximum value, reduces the gain values of the color components at the same ratio so that the largest gain value among the gain values of the color component becomes the maximum value, and the light amount adjusting unit increases the amount of the illumination light.

8. The projection device according to claim 7, wherein as a result of correcting, by the gain adjusting unit, the gain values so that the second light intensity coincides with the first light intensity, if the gain values of all of the color components become less than the maximum value, each of the gain values is increased so that a gain value of at least one of the color components becomes the maximum value, and the light amount adjusting unit reduces the amount of the illumination light.

9. A light amount adjusting method comprising:

at a first time point, storing a brightness of illumination light emitted from a light source unit as a first brightness for a projection video to have a desired brightness, and storing a light intensity of each of all color components of red, green, and blue of the illumination light as a first light intensity, setting the projection video to have a desired color and setting a gain value of at least one of the color components to be a maximum value, and storing the set gain value as a first gain value, at a second time point after the first time point, adjusting an amount of the illumination light so that the brightness of the illumination light emitted from the light source unit coincides with the first brightness, and calculating a ratio between a second light intensity and the first light intensity, the second light intensity being a light intensity of each of the color components of the illumination light emitted from the light source unit, correcting the gain values based on the ratio between the second light intensity and the first light intensity, and if the corrected gain values exceed the maximum value, reducing the gain values of the color components at the same ratio so that the largest gain value among the gain values of the color component becomes the maximum value, and increasing the amount of the illumination light.

10. The light amount adjusting method according to claim 9, wherein after the gain values of the color components are reduced at the same ratio, increasing the amount of the illumination light based on a gamma characteristic so as to compensate for a decrease in a brightness of the projection video due to reduction in the gain values of the color components.

11. The light amount adjusting method according to claim 9, wherein as a result of correcting the gain values so that the second light intensity coincides with the first light intensity, if the gain values of all of the color components become less than the maximum value, each of the gain values is increased so that a gain value of at least one of the color components becomes the maximum value, and reducing the amount of the illumination light.

12. The light amount adjusting method according to claim 11, wherein after each of the gain values is increased so that the gain value of at least one of the color components becomes the maximum value, reducing the amount of the illumination light based on the gamma characteristic so as to compensate for an increase in the brightness of the projection video due to the increase in the gain values of the color components.

13. The light amount adjusting method according to claim 9, wherein setting the amount of the illumination light emitted from the light source unit to less than 100% at the first time point.

14. The light amount adjusting method according to claim 9, wherein the first time point is at a time of initial setting.

* * * * *